(12) United States Patent
Pitsch et al.

(10) Patent No.: US 10,260,642 B2
(45) Date of Patent: Apr. 16, 2019

(54) FAUCET VALVE CARTRIDGE

(75) Inventors: Walter Pitsch, Washington, NJ (US);
Guang Yi Xian, Guangzhou (CN)

(73) Assignee: AS IP Holdco, LLC, Piscataway, NJ (US)

(*) Notice: Subject to any disclaimer, the term of this patent is extended or adjusted under 35 U.S.C. 154(b) by 145 days.

(21) Appl. No.: 13/449,582

(22) Filed: Apr. 18, 2012

(65) Prior Publication Data

US 2012/0273075 A1 Nov. 1, 2012

Related U.S. Application Data

(60) Provisional application No. 61/479,392, filed on Apr. 26, 2011.

(51) Int. Cl.
*F16K 3/04* (2006.01)
*F16K 27/04* (2006.01)

(52) U.S. Cl.
CPC .............. *F16K 3/04* (2013.01); *F16K 27/045* (2013.01); *Y10T 137/86823* (2015.04); *Y10T 137/9464* (2015.04)

(58) Field of Classification Search
USPC .................................................... 137/625.41
See application file for complete search history.

(56) References Cited

U.S. PATENT DOCUMENTS

| 638,611 A | 12/1899 | Totham |
| 2,634,944 A | 4/1953 | Waite |
| 3,780,758 A | 12/1973 | DeVries |
| 3,807,455 A * | 4/1974 | Farrell ...................... 137/625.31 |
| 3,831,621 A * | 8/1974 | Anthony et al. .............. 137/270 |
| 3,834,416 A | 9/1974 | Parkinson |

(Continued)

FOREIGN PATENT DOCUMENTS

| GB | 1440889 | 6/1976 |
| JP | 3089080 A | 4/1991 |

(Continued)

OTHER PUBLICATIONS

PCT International Search Report and Written Opinion for PCT/US 12/34754 dated Jul. 17, 2012, 11 pages.

(Continued)

*Primary Examiner* — John Fox
(74) *Attorney, Agent, or Firm* — Morrison & Foerster LLP

(57) ABSTRACT

Valve cartridges for a faucet are described herein. The valve cartridge has a body with a longitudinal passage, and a side opening. The cartridge has a spindle with a lower end portion in rotatable relationship with the body's interior surface, and an upper outwardly extending end portion. Included is a movable disk with a surface that contacts and interacts with the lower end portion of the spindle, an arcuate side wall portion and an inwardly extending side wall portion with a fluid receiving area that allows for fluid flow out of the body side opening. A stationary disk with a through opening allows passage of fluid from a body inlet through the side opening when the opening in the disk is aligned with the fluid receiving area. A sealing ring, which mates with the body, is provided to stabilize the stationary and movable disks within the body passage.

28 Claims, 14 Drawing Sheets

(56) References Cited

U.S. PATENT DOCUMENTS

| | | | | |
|---|---|---|---|---|
| 4,064,904 | A | * | 12/1977 | Tolnai ................... F16K 31/508 137/454.5 |
| 4,331,176 | A | * | 5/1982 | Parkison ................... F16K 3/08 137/454.5 |
| 4,651,770 | A | * | 3/1987 | Denham et al. .............. 137/270 |
| 4,793,375 | A | | 12/1988 | Marty |
| 4,821,765 | A | | 4/1989 | Iqbal et al. |
| 5,398,717 | A | | 3/1995 | Goncze |
| 5,402,827 | A | | 4/1995 | Gonzalez |
| 5,417,242 | A | * | 5/1995 | Goncze .............. F16K 11/0787 137/625.17 |
| RE35,545 | E | | 7/1997 | Chrysler |
| 5,681,028 | A | | 10/1997 | Cook et al. |
| 5,832,952 | A | | 11/1998 | Cook et al. |
| 5,979,777 | A | | 11/1999 | Ems |
| 6,062,251 | A | * | 5/2000 | Pitsch ........................... 137/270 |
| 6,073,647 | A | * | 6/2000 | Cook et al. .............. 137/315.12 |
| 6,202,695 | B1 | | 3/2001 | Wu |
| 6,220,294 | B1 | * | 4/2001 | Ko ........................... F16K 3/08 137/246 |
| 6,247,496 | B1 | | 6/2001 | Ko |
| 6,263,919 | B1 | | 7/2001 | Knapp |
| 6,910,673 | B2 | * | 6/2005 | Green et al. .................. 251/118 |
| 7,004,197 | B2 | * | 2/2006 | Gilbert ...................... F16K 3/08 137/625.31 |
| 7,108,011 | B1 | | 9/2006 | Lordahl et al. |
| 7,165,570 | B1 | | 1/2007 | Lordahl et al. |
| 7,306,005 | B2 | | 12/2007 | Moldthan |
| 7,331,359 | B2 | * | 2/2008 | Shay ......................... F16K 3/08 137/454.2 |
| 7,607,639 | B2 | * | 10/2009 | Chen ......................... F16K 3/08 137/625.31 |
| 2008/0054210 | A1 | | 3/2008 | Smith |
| 2008/0179559 | A1 | | 7/2008 | Kacik |
| 2010/0147407 | A1 | | 6/2010 | Rosko et al. |

FOREIGN PATENT DOCUMENTS

| | | |
|---|---|---|
| JP | 09242897 A | 9/1997 |
| JP | 2001003408 A | 1/2001 |
| JP | 2002106732 A | 4/2002 |
| JP | 2004251050 A | 9/2004 |
| JP | 2006097336 A | 4/2006 |
| JP | 2007-170510 A | 7/2007 |
| JP | 2010007816 A | 1/2010 |

OTHER PUBLICATIONS

PCT International Preliminary Report on Patentability for PCT/US 12/34754 dated Mar. 18, 2014, 8 pages.

Taiwanese Office Action dated Feb. 22, 2016 (English Translation), issued in Application No. 101114340 (Counterpart of parent U.S. Appl. No. 13/449,582) (7 pages).

Taiwanese Office Action response dated Oct. 24, 2016 (English Translation), in Application No. 101114340 (Counterpart of parent U.S. Appl. No. 13/449,582) (6 pages).

Chinese Office Action dated Sep. 6, 2015 (English Translation), issued in Application No. 2012800205161 (Counterpart of parent U.S. Appl. No. 13/449,582) (3 pages).

Response to Chinese Office Action dated Mar. 21, 2016 (English Translation) in Application No. 2012800205161 (Counterpart of parent U.S. Appl. No. 13/449,582) (3 pages).

Second Chinese Office Action dated Jul. 5, 2016 (English Translation), issued in Application No. 2012800205161 (Counterpart of parent U.S. Appl. No. 13/449,582) (8 pages).

Japanese Office Action dated Feb. 2, 2016 (English Translation), issued in Application No. 2014/508478 (Counterpart of parent U.S. Appl. No. 13/449,582) (7 pages).

Japanese Office Action response dated Aug. 2, 2016 (English translation), in Application No. 2014/508478 (Counterpart of parent U.S. Appl. No. 13/449,582) (11 pages).

Mexican Office Action dated Jan. 19, 2016 (Spanish only), issued in Application No. MX/a/2013/021388 (Counterpart of parent U.S. Appl. No. 13/449,582) (3 pages).

Response to Mexican Office Action dated May 20, 2016 in Application No. MX/a/2013/021388 (Counterpart of parent U.S. Appl. No. 13/449,582) (10 pages).

Second Mexican Office Action dated Aug. 25, 2016 in Application No. MX/a2013/021388 (Counterpart of parent U.S. Appl. No. 13/449,582) (Spanish only) (4 pages).

Response to Second Chinese Office Action dated Oct. 20, 2016 in Application No. 2012800205161 (Counterpart of parent U.S. Appl. No. 13/449,582) (English translation) (6 pages).

Notice on the Third Office Action dated Mar. 2, 2017, directed to CN Application No. 2012800205161; 16 pages.

Notice on the Fourth Office Action dated Sep. 4, 2017, directed to CN Application No. 2012800205161; 15 pages.

Office Action dated Jan. 31, 2017, directed to JP Application No. 2014/508478; 10 pages.

Third Office Action dated Apr. 18, 2017, directed to MX Application No. MX/a2013/021388; 7 pages.

Notice of Allowance dated Jan. 24, 2017, directed to TW Application No. 101114340; 3 pages.

Fourth Office Action dated Nov. 29, 2017, directed to MX Application No. MX/a/2013/012388; 9 pages.

Notice on the Fifth Office Action dated Jun. 4, 2018, directed to CN Application No. 201280020516.1; 20 pages.

Office Action dated Feb. 16, 2018, directed to CA Application No. 2,834,335; 9 pages.

Decision of Final Rejection dated Jan. 9, 2018, directed to JP Application No. 2014-508478; 10 pages.

Decision on Rejection dated Oct. 8, 2018, directed to CN Application No. 201280020516.1; 10 pages.

Office Action dated Nov. 6, 2018, directed to CA Application No. 2,834,335; 8 pages.

\* cited by examiner

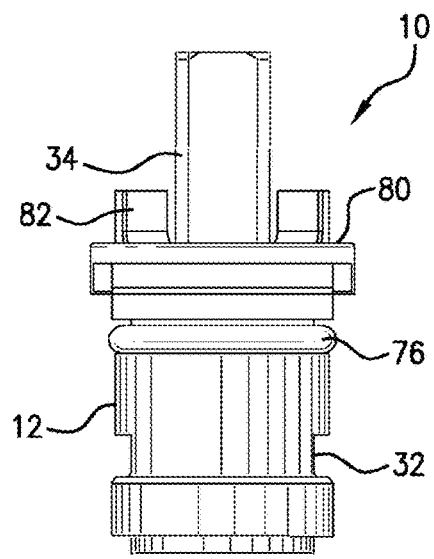
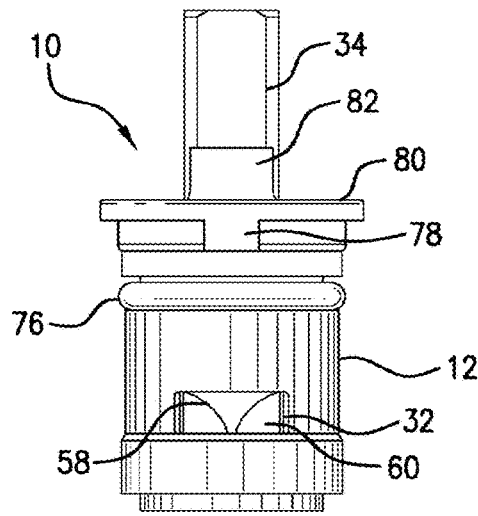
FIG.3          FIG.4
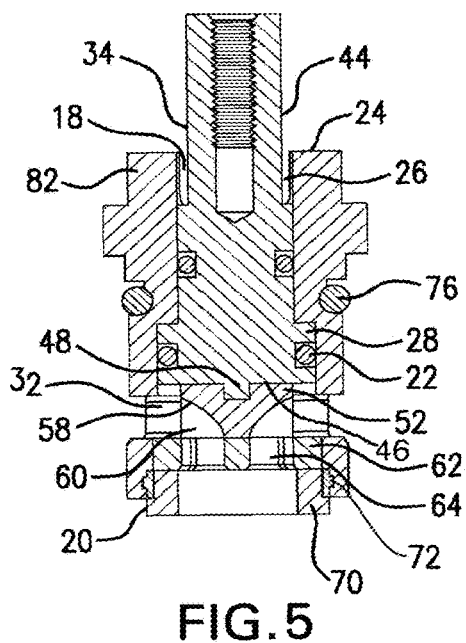
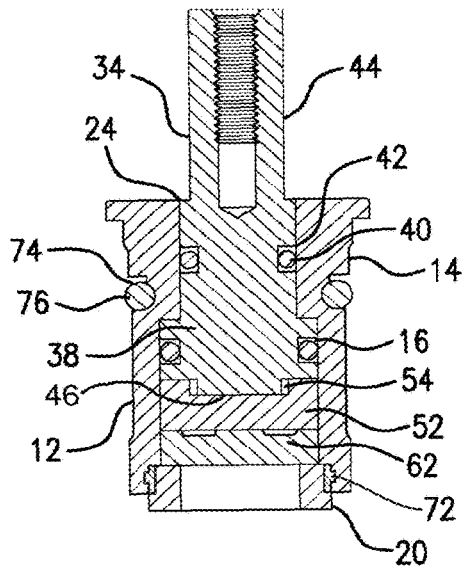
FIG.5          FIG.6

FAUCET VALVE CARTRIDGE

CROSS-REFERENCE TO RELATED APPLICATION

This application claims the benefit under 35 U.S.C. § 119(e) to U.S. Provisional Patent Application No. 61/479,392, filed Apr. 26, 2011, the entire disclosure of which is incorporated herein by reference.

BACKGROUND OF THE INVENTION

Field of the Invention

The present invention relates to the field of hot and cold water faucets having open and close mixing valve cartridges.

Description of Related Art

Valve cartridges are known in the art for faucet handles, whether for a single-handled faucet having a single mixing cartridge accepting flow from two water sources (hot and cold) or a two-handled faucet each having a cartridge to limit the amount of hot or cold flow through one of the faucets so as to adjust water temperature and flow volume exiting the faucet head. Such cartridges typically have a main housing and rotating valve pieces for controlling flow. A shaft or spindle extends through the center of the valve cartridge which is configured to interact with a faucet handle so as to turn or otherwise respond to allow water flow adjustment when the faucet handle interacting with the spindle is turned or moved depending on the faucet design.

The central spindle is typically subjected to force load in operation both in the axial direction as the user presses on the handle or in the lateral rotation direction as the spindle turns in the device and as the other parts act against the spindle both as a result of operating force to turn the spindle and frictional force as the spindle rubs against other parts. Various cartridge designs are known in the art to deal with this issue. See for example, U.S. Patent Publication No. 2008/0054210 A1 which incorporates a further part, a bushing, to account for use of more economical materials than traditional metal parts. Such force and friction wear can contribute to valve failure or leakage at the faucet area. Some of this issue is dealt with by using ceramic seals, however, such devices may require redesign to accommodate the ceramic seal. See, e.g. U.S. Pat. No. 6,202,695 (using an offset eccentric flow passage) and U.S. Reissue Pat. No. 35,545 (using a specialized frictional protective retainer for protecting the cartridge valve seal.

Varying designs are created to take account of these effects and/or to improve interaction with the faucet handle(s) while trying to maintain standardization in terms of flow rate and fitted parts.

There is still a need in the art to reduce friction, wear and failure in faucet handle valve cartridges, while providing adequate or enhanced flow through the cartridge device. There is further a need in the art for an adaptable design that works with increasingly creative modern faucet and faucet handle design features.

BRIEF SUMMARY OF THE INVENTION

The invention includes an economical cartridge with few parts that operates smoothly while providing good flow rates, and which is preferably a valve cartridge of a reduced overall profile to allow for use in smaller areas of a faucet handle, unique design faucet handles and to enable the introduction of new and unique faucet assembly and handle designs. Reduction in overall size and surface area provides an improvement by reducing friction, wear and load forces that otherwise impact operation of a standard valve cartridge.

In one embodiment, the invention includes a valve cartridge for a faucet, comprising a body having an exterior surface, an interior surface defining a longitudinally extending passage therethrough extending from an inlet opening to an outlet opening, and at least one side opening extending transversely through the body from the interior surface to the exterior surface; a spindle having a lower end portion configured to fit in rotatable relationship with the interior surface of the body when situated within the passage of the body, an upper end portion that extends outwardly beyond the outlet opening of the body when the spindle is situated in the passage of the body, the lower end portion having a bottom surface, wherein the upper end portion is configured to be fitted within a faucet handle; a movable disk having an upper surface configured to contact and interact with the bottom surface of the lower end portion of the spindle, an arcuate side wall portion configured to fit within the passage of the body in rotatable facing relationship with the interior surface of the body and an inwardly extending side wall portion defining at least one fluid receiving area, wherein the receiving area is configured so that it can be rotated to align with the side opening in the body for allowing fluid flow out of the side opening of the body; a stationary disk having at least one opening therethrough for allowing passage of fluid from an inlet opening of the body through the side opening of the body when the opening in the stationary disk is aligned with the fluid receiving area in the movable disk, the stationary disk having a side wall capable of interacting with the interior surface of the body; and a sealing ring for stabilizing and retaining the stationary disk and movable disk within the passage of the body, the sealing ring capable of mating with the body.

The body is preferably no greater than about 25 mm measured longitudinally, no greater than about 20 mm measured transversely at the outlet end of the body, and not greater than about 19 mm measured transversely at the inlet end of the body. The body may more preferably be no greater than about 20 mm measured longitudinally, no greater than about 19 mm measured transversely at the outlet end of the body, and not greater than about 15.5 mm measured transversely at the inlet end of the body. The exterior surface preferably comprises at least one sealing groove for receiving a seal therein. The exterior surface of the body may also optionally comprise at least one feature on an upper portion thereof on or near the outlet end of the body for use in seating the valve cartridge within or on a fluid conduit. For example, the feature may be a locking tab and the body may comprise two opposed locking tabs. The upper surface of the cartridge body at the outlet end thereof may also have at least one raised stop feature thereon for limiting rotational movement of the valve cartridge when in use. For example, there may be two opposing raised wedge-shaped stop features. The valve cartridge may alternatively have two opposing arcuate stop features each having a side surface, wherein the cartridge further comprises a rotatable stop disk for engaging the side surfaces of the arcuate stop features and the rotatable stop disk can be situated so as to enable orientation of the cartridge body for operational rotation in either a clockwise or counterclockwise direction.

A lower end portion of the spindle may have a groove on the exterior thereof for receiving a seal capable of providing sealing engagement between the interior surface of the body and the lower end portion of the spindle. The interior surface of the cartridge body at a location on or near the inlet end of the body may also have a groove for receiving the sealing ring.

It is also preferred that at least one of the movable disk, the stationary disk and/or the housing comprises a ceramic material. The sealing ring may comprise at least one of polytetrafluoroethylene, silicone, silicone rubber, ethylene-propylene rubber, ethylene-propylene diamine rubber, ethylene-propylene polymethylene rubber, nitrile rubbers, fluoroplastics and/or fluoroelastomers. The spindle may optionally comprise a metal lower end portion and a plastic upper end portion. The spindle may also comprises a stainless steel lower end portion and an upper end portion comprising polyamide, PPO and/or PPS. Preferably, the spindle upper end portion and lower end portion each comprise stainless steel. The upper end portion of the spindle may also have a threaded recess therein for receiving a screw or threaded insert for securely attaching the cartridge to a faucet handle.

The cartridge body preferably has two side openings and the stationary disk has two openings therethrough for allowing passage of fluid from the inlet opening of the body through the side openings of the body when the openings in the stationary disk are aligned with the fluid receiving areas in the movable disk. Preferably, there are two fluid receiving areas in the movable disk, and the stationary disk has at least one locking extension that is capable of mating with a mating groove on an interior surface of the body. The sealing ring is preferably flexible.

Also within the invention in an embodiment is a faucet assembly having at least one valve cartridge, the assembly comprising a faucet comprising at least one faucet handle; a fluid conduit attachable thereto for introduction of fluid to the assembly; a faucet body having an outlet for releasing fluid at an outlet end and an inlet end in fluid communication with the fluid conduit; and a base for mounting the faucet handle and/or the faucet body, the base having an upper surface; and at least one cartridge comprising: a cartridge body having an exterior surface, an interior surface defining a longitudinally extending passage therethrough extending from an inlet opening to an outlet opening, and at least one side opening extending transversely through the body from the interior surface to the exterior surface; a spindle having a lower end portion configured to fit in rotatable relationship with the interior surface of the body when situated within the passage of the body, an upper end portion that extends outwardly beyond the outlet opening of the body when the spindle is situated in the passage of the body, the lower end portion having a bottom surface, wherein the upper end portion is configured to be fitted within a faucet handle; a movable disk having an upper surface configured to contact and interact with the bottom surface of the lower end portion of the spindle, an arcuate side wall portion configured to fit within the passage of the body in rotatable facing relationship with the interior surface of the body and an inwardly extending side wall portion defining at least one fluid receiving area, wherein the receiving area is configured so that it can be rotated to align with the side opening in the body for allowing fluid flow out of the side opening of the body; a stationary disk having at least one opening therethrough for allowing passage of fluid from an inlet opening of the body in fluid communication with the fluid conduit, through the side opening of the body, when the opening in the stationary disk is aligned with the fluid receiving area in the movable disk, the stationary disk having a side wall capable of interacting with the interior surface of the body; and a sealing ring for stabilizing the stationary disk and movable disk within the passage of the body, the sealing ring capable of mating with the body.

The faucet assembly may have various embodiments of the cartridges described herein incorporated therein. In one such embodiment, each of the at least one cartridge body in the faucet assembly has an upper surface at the outlet end thereof having at least one raised stop feature thereon for limiting rotational movement of the cartridge when in use, and wherein the at least one handle has a feature on an internal surface thereof that interacts with the at least one stop feature. There may be two opposing raised wedge-shaped stop features on each of the at least one cartridge.

In another embodiment, there may be two opposing arcuate stop features each having a side surface on each of the at least one cartridge, and each of the at least one cartridge may further comprise a rotatable stop disk for engaging the side surfaces of the arcuate stop features. The rotatable stop disk can be situated so as to enable orientation of the cartridge body for operational rotation in either a clockwise or counterclockwise direction. An optional bonnet nut for positioning over each of the at least one cartridge can also be provided as well as an optional seal for positioning between the bonnet nut and the spindle of the cartridge.

In another embodiment, instead of stop features on the cartridge, the upper surface of the base of the assembly may be configured so as to have at least one raised stop feature which comprises at least two opposing upwardly extending ribs which are positioned to engage at least two opposing ribs on the internal surface of one of the at least one faucet handle. The at least two opposing ribs on the base of the faucet assembly may have an arcuate transverse cross-section and extend perpendicularly to the upper surface of the base. The at least two opposing ribs on the internal surface of the at least one handle may be configured to have a wedge-shaped longitudinal cross-section and can be positioned such that the opposing ribs on the base and the opposing ribs on the internal surface of the at least one faucet handle engage one another for allowing the at least one faucet handle to turn the spindle of the cartridge body for allowing fluid flow through the cartridge body and into the faucet body ranging from no fluid flow to a maximum fluid flow.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 3 is side elevational view of the valve cartridge of FIG. 1;

FIG. 4 is a further side elevational view of the valve cartridge of FIG. 1 showing a side opening therein;

FIG. 5 is a longitudinal cross-sectional view of the valve cartridge of FIG. 3 taken along the longitudinal axis of FIG. 3;

FIG. 6 is a longitudinal cross-sectional view of the valve cartridge of FIG. 4 taken along the longitudinal axis of FIG. 4;

DETAILED DESCRIPTION OF THE INVENTION

Water conservation goals, as well as improved design can be obtained by a simplified and scaled down cartridge, preferably a mini-cartridge. By redesigning a faucet valve cartridge to be smaller in size, contact surface area and load on parts are reduced, thereby helping to reduce potential for failure due to wear and associated leakage. Further, by reducing also the number of working parts, a smaller, more compact and durable cartridge can be achieved, which is also economical to make. Surprisingly, such advantages are achieved while also maintaining similar flow effects at about 2.5 liters/min or less. This is achieved by the present design without limiting the nature of type of the lower seal and without addition of extra parts to address friction and wear issues such as extra bearings and similar parts known in the prior art.

Figure 1:
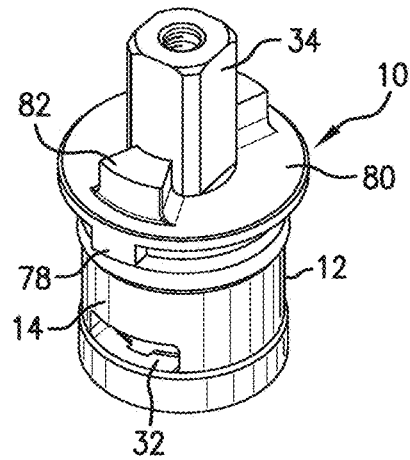
FIG. 1 is a perspective view of one embodiment of a valve cartridge according to the invention.
Figure 7:
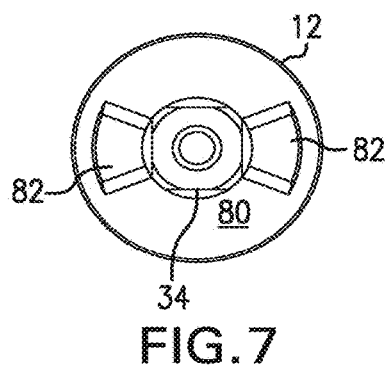
FIG. 7 is a top elevational view of the valve cartridge of FIG. 1.
Figure 8:
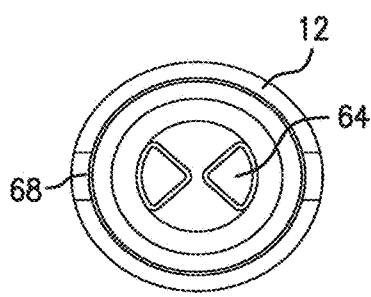
FIG. 8 is a bottom elevational view of the valve cartridge of FIG. 1.
Figure 10:
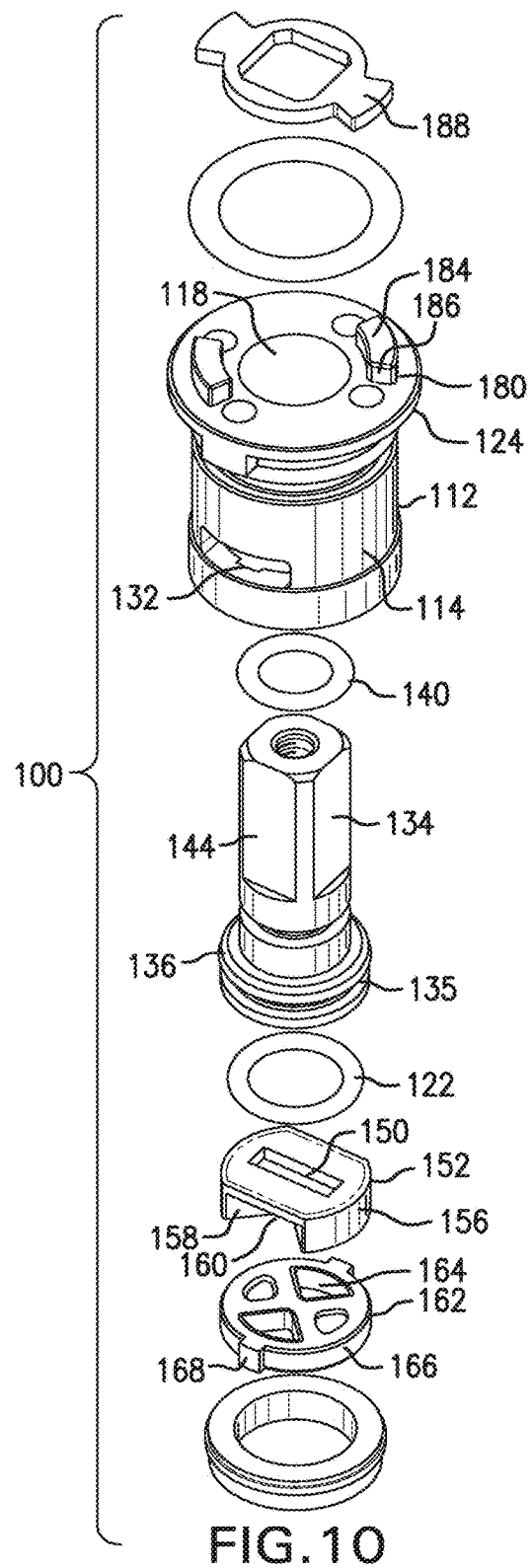
FIG. 10 is an exploded view of the valve cartridge of FIG. 9.
Figure 17:
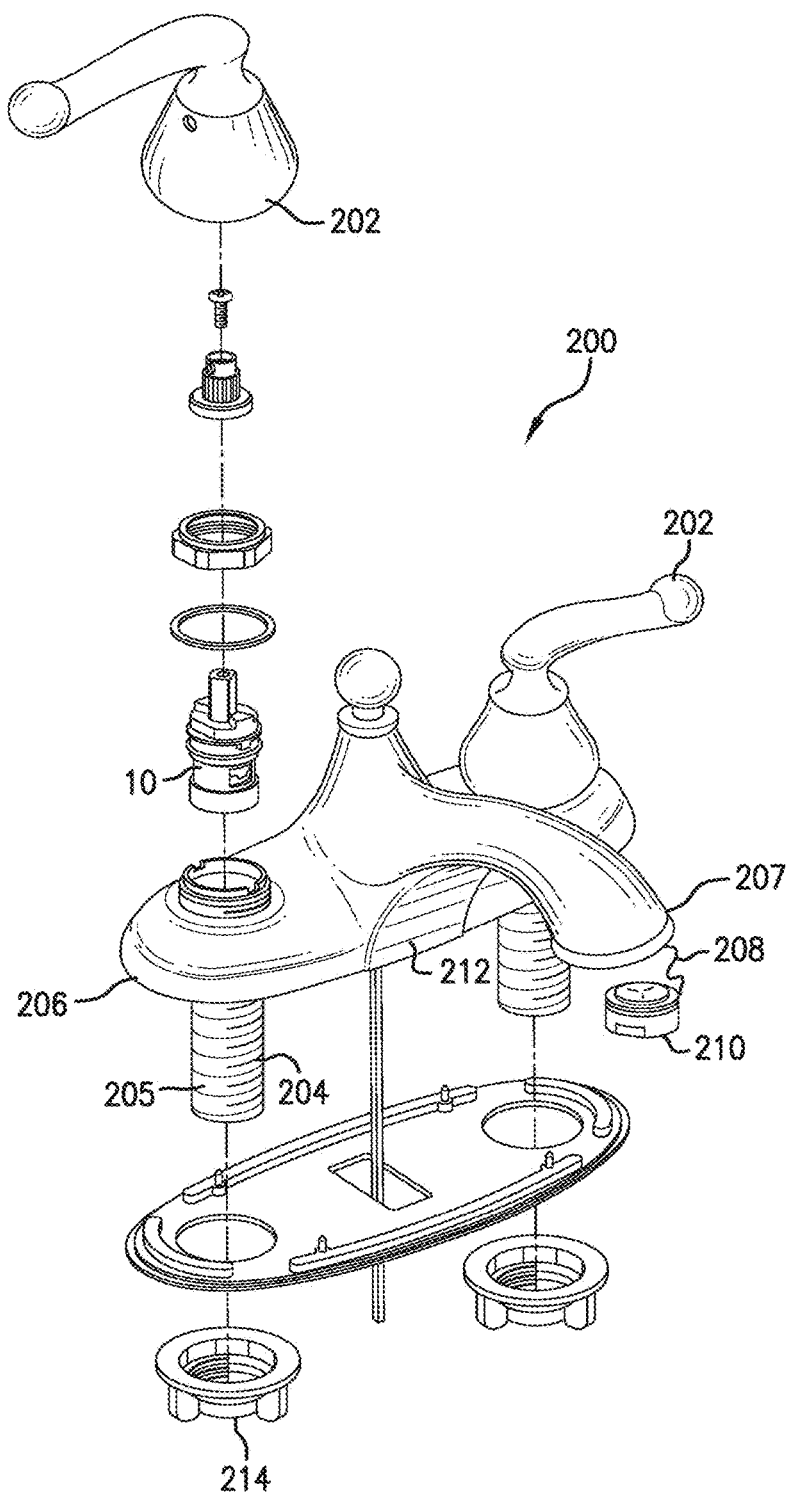
FIG. 17 is a perspective exploded view of the embodiment of a faucet assembly including the valve cartridge of FIG. 1.

As shown in FIG. 1, the invention includes a valve cartridge, generally referred to herein as cartridge 10, for a faucet, and when in use, as part of a faucet assembly such as assembly 200 herein shown in FIG. 17. The cartridge 10 includes a body 12 which has an exterior surface 14 and an interior surface 16. As shown the exterior surface is preferably generally cylindrically shaped so as to easily be situated in a flow conduit for fluid to act as an in-line valve between the conduit and the outlet of a faucet. However, other exterior shapes are within the scope of the invention. The body may be formed of a variety of materials, such as, for examples, metals and metal alloys (e.g., nickel, titanium, stainless steel, etc.) as well as polymeric or hard rubber materials (e.g., polystyrene-butadiene-styrenes (SBS), polyacrylonitrile-butadiene-styrenes (ABS), polyamides (PA), polyimides (PI), polyarylenes (polyetherether ketone (PEEK), polyether ketone (PEK), polyether ketone ketone (PEKK) and the like), polyethylene sulfones (PES), polyetherimides (PEI), polytetrafluoroethylene (PTFE), moldable fluoroplastics (FEP and PFA), olefinic rubbers, polyethylenes (PE), polypropylenes (PP), polyoxyalkylenes (i.e., polyacetals) such as polyoxymethylenes (POM), polyoxyethylenes (POE), polyoxybutylenes (POB), etc., styrene-maleic-anhydrides (SMA), polyphenylene sulfides (PPS), polyphenylene oxides (PPO) and other similar molding materials, composites, blends and/or copolymers of these materials, and other materials provided the materials provide adequate strength and preferably surface qualities and tribological properties to function as a faucet body. The body is preferably comprises PPS, PPO, PA or a polyoxymethylene copolymer such as CELCON® M90 CF-2001, commercially available from Ticona, a division of Celanese, or DELRIN®, commercially available from E. I. DuPont de Nemours & Company. Composites comprising these materials compatibilized with one or more thermoplastic or rubber as noted above can be prepared also to reduce wear and enhance tribological properties.

The interior surface 16 of the body 12 defines a longitudinally extending passage 18 through the body as shown in FIGS. 5 and 6. The passage 18 preferably extends from an inlet 20 opening in the body through the bottom of the body to an outlet opening 24 at the top of the body. The passage can have a generally cylindrical configuration conducive to use of rotating parts therein and/or can also have one or more sections or zones to accommodate the size and shape of various parts therein. As shown, the passage has an upper portion 26 which is of a preferred narrower transverse diameter as shown in FIGS. 5 and 6 to correspond to the size of the spindle (although this may vary), and a lower wider transverse diameter section 28 that is preferably wider to accommodate other parts of the valve (disks and sealing ring as well as rotating sealed base portion of the spindle as described below). In the lower section of the body at or near the inlet opening 20 of the body also includes a feature that will contribute to engaging a sealing ring. As shown, such a feature can be a gripping portion 130 having a groove or indentation therein such that the gripping piece sits within a groove on the exterior of the sealing ring.

The body further includes at least one side opening 32 extending transversely through the body from the interior surface 16 to the exterior surface 14 of the body 12. The opening is preferably in the lower portion of the body just above the inlet end 20 of the body. The side opening 32 is preferably located to be compatible with traditional faucet design in that water or other fluid flowing upwards through the inlet end 20 of the body in to passage 18 would encounter the stationary disk and pass through the opening therein when in the open valve mode until it entered the receiving area of the movable disk and could then flow out the side opening 32 in the body to continue on to feed the faucet body and outlet of the faucet. Thus the side opening 32 should be positioned to accommodate that flow in an unimpeded manner within the given design. The opening is preferably rectangular for flow characteristics as shown, but can also have varied configurations, such as oval, circular, square, elliptical and the like. As shown, two such side openings 32 are shown which is compatible with the number of openings and receiving areas in the disks of the cartridge, but it should be understood based on this disclosure that only one or more than two such openings could be provided if desired.

The body 12 is preferably sized so as to be compact and smaller than typical valve cartridges so as to have fewer working parts, to be less expensive to manufacture and to accommodate many and varied faucet designs, while still, surprisingly, delivering good flow performance. Preferably, in one embodiment herein, the body is no greater than about 26 mm, more preferably no greater than 25 and in one embodiment no greater than about 22 mm (depending on whether stops are provided as discussed further hereinbelow). It may also be smaller, and preferably no greater than 20 mm or no greater than 18 mm, when measured longitudinally along the body. It is also preferably no greater than about 20 mm measured transversely at the outlet end of the body, and more preferably no greater than about 19 mm measured in that direction. Preferably also, the body is no greater than about 19 mm, and more preferably 15.5 mm measured transversely at the inlet end of the body.

Figure 2:
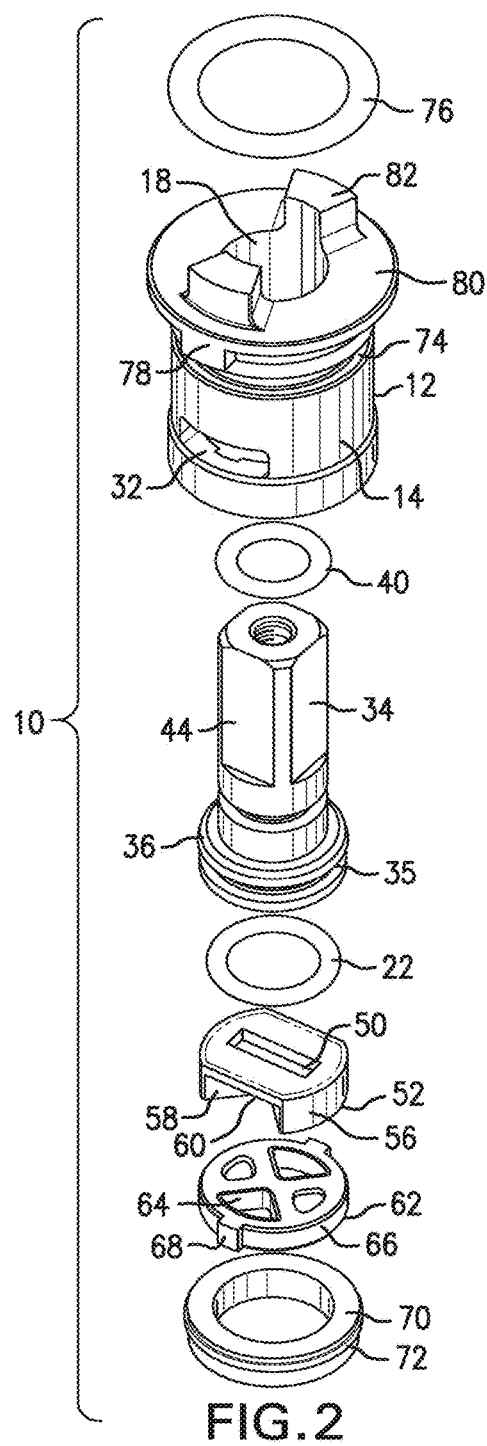
FIG. 2 is an exploded view of the valve cartridge of FIG. 1.

A spindle 34 is also part of the cartridge and has a lower end portion 36 which is configured to fit in rotatable relationship with the interior surface 16 of the body 12 when situated within the passage 18 of the body 12. As shown, the lower portion of the spindle sits within the passage and has one or more seals to prevent leakage around the spindle. Two such seals in the form of O-rings are shown in FIGS. 2, 5 and 6. One O-ring 22 is placed along the lower end portion 36 of the spindle 34, which as shown in this embodiment is somewhat wider than the rest of the spindle and sits within a groove 35 in the lower end portion 36 of the spindle 34, which is situated in the lower portion 28 of the passage 18 of the body 12. The lower end portion of the spindle preferably has such a groove on the exterior thereof for receiving a seal capable of providing sealing engagement between the interior surface of the body and the lower end portion of the spindle.

The other O-ring 40 is situated in a second groove 42 in an upper end portion 44 of the spindle 34 that extends outwardly beyond the outlet opening 24 of the body 12 when the spindle 34 is situated in the passage 18 of the body 12. The upper end portion of the spindle preferably has a threaded recess therein (or other snap-fit, friction-fit, gripping fit or the like) for receiving a screw or threaded insert, or may have a plain recessed hole without threading as well. It may be configured to receive a screw-in fit, a mating snap-fit, slide-in fit, friction fit or gripping surface, for attaching the cartridge to a faucet handle so as to be rotatable and function with the handle. The lower end portion 36 of the spindle 34 has a bottom surface 46. The upper end portion 44 of the spindle as shown in FIGS. 1-6 is configured to be fitted within a faucet handle (see FIG. 17).

The bottom surface 46 preferably has a feature(s) which allows for interaction with a movable disk (as described below) so that when the upper portion 44 of the spindle is fitted within a faucet handle and turned, it will then turn the movable disk and activate the open/close feature of the cartridge. The rotational movement of the spindle (in response to the faucet handle) when interconnected and/or interacting with the movable disk effects opening/closing operation of the cartridge. Thus, some feature to allow such rotation interaction is preferred. As preferred, the bottom surface 46 has a tab or opening therein which can interlock with a matching tab or opening in the movable disk. A tab 48 is shown in FIG. 5 which fits in a slot 50 in a movable disk so that turning of a faucet handle interacting with the spindle 34, turns the spindle 34 that also turns the movable disk for opening and closing the cartridge valve. The spindle may be formed of any of the materials noted above for the body, but should have sufficient structural integrity and interaction with the faucet handle, and of a material safe for contact with drinking water. The spindle may be formed of a one-piece construction, wherein the whole spindle is formed of stainless steel or other safe metal or wholly of a plastic (such as the polymeric materials noted above). In one embodiment, the spindle may be a two-piece construction separated by a groove and/or seal wherein the upper portion is a polymeric material and the lower portion is formed of a metal such as stainless steel.

A movable disk 52 is included within the body in the passage 18 thereof, which has an upper surface 54 configured to contact and interact with the bottom surface 46 of the lower end portion 36 of the spindle 34. As shown, the upper surface 54 has a slot 50 for receiving a tab 48 therein. However, the tab and opening could be reversed and other interacting features may also be used. If the disk is of a preferred generally cylindrical shape to fit within a preferred generally cylindrical portion of the passage 18 in the lower portion 28 in the passage 18, it also preferably has an arcuate side wall portion 56 configured to fit within the passage of the body in rotatable facing relationship with the interior surface 16 of the body 12. Preferably, there are two opposing arcuate side walls, however, there may be more than two. There is also at least one inwardly extending side wall portion 58 defining at least one fluid receiving area 60 is within the movable disk 52. Such inwardly extending side wall portion may have various configurations within the scope of design, however, a curved configuration as shown in FIGS. 2 and 5 is preferred for directing flow and preferred fluid flow dynamics. The receiving area 60 is configured so that when the disk 52 is rotated to align the receiving area 60 with the side opening 32 in the body 12, it will allow fluid flow out of the side opening of the body for feeding the faucet to which it is installed with fluid entering the cartridge from a conduit through the open inlet end 20 of the cartridge.

A stationary disk 62 is also include in the design that works with the movable disk by providing at least one opening 64 extending through the stationary disk 62 for allowing passage of fluid from an inlet end 20 of the body 12 entering the passage 18 therethrough through the stationary disk and into the receiving area 60 of the movable disk, then out the side opening 32 of the body when the cartridge is in the open position mode. Thus, when the opening 64 in the stationary disk 62 is aligned with the fluid receiving area 60 in the movable disk 52, such flow can be achieve. If it is not aligned, flow can be restricted and/or stopped altogether when a faucet handle is turned to reduce and/or shut off flow. The stationary disk 62 also has a side wall 66 that is preferably capable of interacting with the interior surface 16 of the body 12 so as to help stabilize the disk 62 in place and with other parts within the body. One such interaction may be achieved by inclusion of, for example, locking tabs 68 which can be sized and shaped so as to fit within similar openings on the interior wall 16 of the body 12 (tabs and openings can be reversed with the tab on the interior wall and the opening on the stationary disk, or other interactive features provided without departing from the spirit of the invention). As there may be more than one side opening 32 in the body, more than one receiving area 60 in the movable disk, there may also be more than one opening 64 in the stationary disk to accommodate flow.

The movable disk and stationary disk may be formed of any of the various materials noted above, but also may preferably be formed of a ceramic-based material to provide enhanced wear and resistance to deformation as well as to resist bacteria and clogging.

A sealing ring 70 is preferably included as well for stabilizing the stationary disk 62 and movable disk 52 as well as the spindle 34 within the passage 18 of the body. The sealing ring also serves to seal the cartridge within a conduit feeding fluid to the inlet end 20 of the body and is preferably configured so as to be capable of interacting with the body and preferably mating with the body to retain the sealing ring. As shown, the sealing ring is a single one-piece ring having a groove 72 therein, e.g., for interacting with, mating with and sealing against gripping portion 130 on a lower portion of the body 12 at or near the inlet end 20 of the body 12. The sealing ring may be made of suitable thermoplastic or elastomer, and may be formed of bacterial resistant material, tribological composite material or other materials, but is preferably flexible and elastomeric for ease of use, good sealing and ease of replacement. Preferably, the sealing ring includes one or more of the following materials or combinations and/or copolymers thereof: ethylene-propylene rubber, ethylene-propylene diamine rubber, nitrile, polytetrafluoroethylene, silicone, silicone rubber and/or fluoroplastics or fluoroelastomers.

For seating the cartridge, it is also preferred that the body further includes an outer seal of some kind for sealing the cartridge on installation in a fluid supply conduit. Such sealing may be accomplished, for example, by providing a sealing groove 74 on the exterior surface 14 of the body for receiving a seal, such as O-ring 76, therein. The exterior surface 16 of the body may also preferably include at least one feature, such as a locking tab or snap fit mechanism on its upper outlet end portion on or near the outlet end 24 of the body for use in seating the valve cartridge within or on a fluid conduit having a mating feature placed thereon. As shown, a locking tab 78 is shown that can interlock with a receiving opening in a conduit (not shown). However, other locking or stabilizing features can also be used if desired. Two or more of such locking tabs, including two opposed locking tabs may be provided within the scope of the invention.

In further embodiments of the invention, an upper surface 80 at the outlet end 24 of the body 12 may also have one or more stop features. For example, at least one raised stop feature may be placed on the upper surface 80 for limiting rotational movement of the valve cartridge when in use and actuated by a faucet. This helps for smooth faucet use, limited range of motion and a desired mating of the various flow openings within a particular rotational range. As shown in FIGS. 1-7, two opposing raised wedge-shaped stop features 82 are shown.

Figure 9:
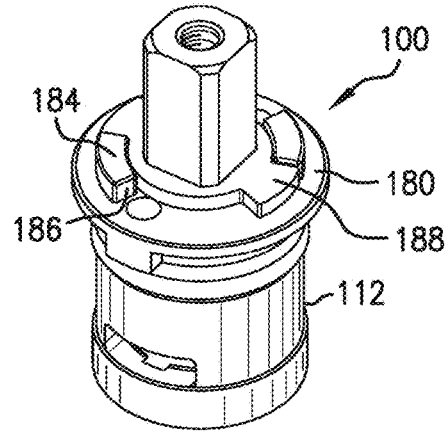
FIG. 9 is perspective view of an alternative embodiment of a valve cartridge according to the invention.
Figure 15:
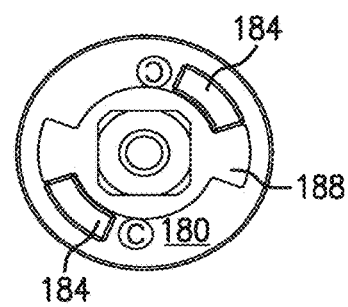
FIG. 15 is a top elevational view of the valve cartridge of FIG. 9.
Figure 16:
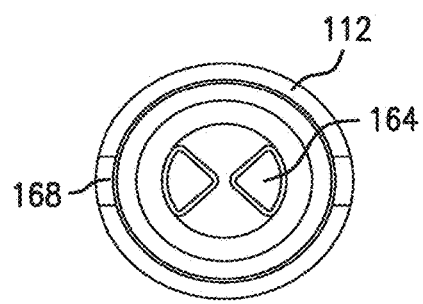
FIG. 16 is a bottom elevational view of the valve cartridge of FIG. 9.
Figure 13:
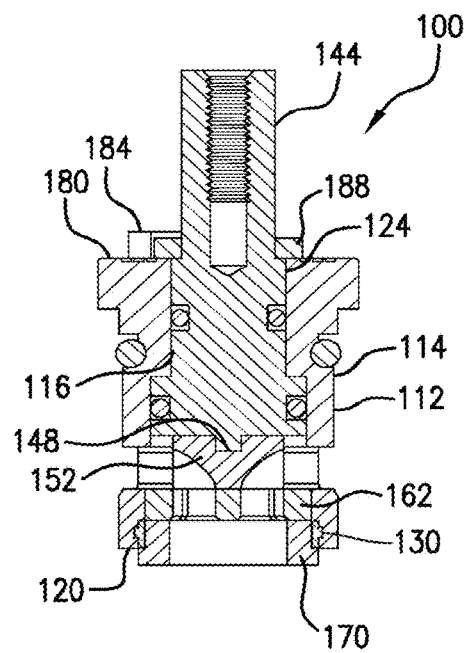
FIG. 13 is a longitudinal cross-sectional view of the valve cartridge of FIG. 11 taken along the longitudinal axis of FIG. 11.
Figure 14:
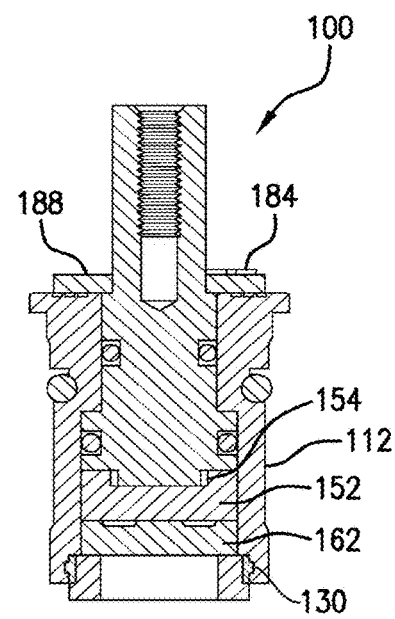
FIG. 14 is a longitudinal cross-sectional view of the valve cartridge of FIG. 12 taken along the longitudinal axis of FIG. 12.
Figure 11:
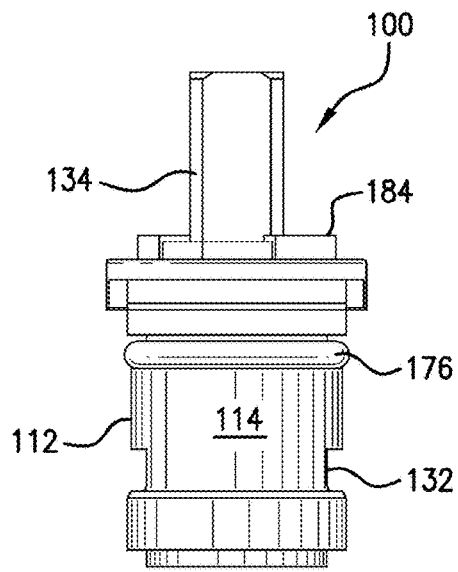
FIG. 11 is side elevational view of the valve cartridge of FIG. 9.
Figure 12:
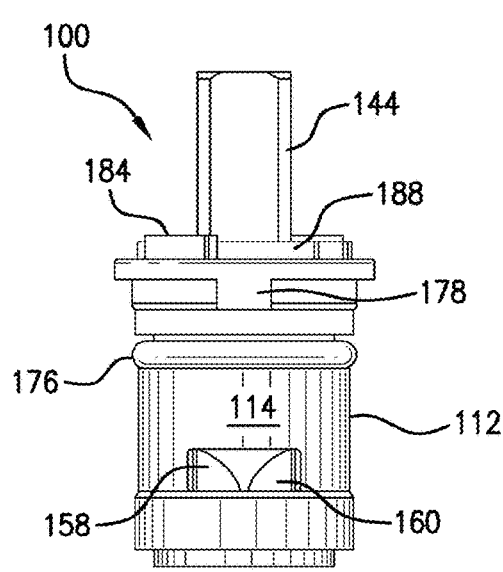
FIG. 12 is a further side elevational view of the valve cartridge of FIG. 9 showing a side opening therein.

In an alternative embodiment of the cartridge as best shown in FIGS. 9-16 and in the faucet assembly 500 in FIGS. 28-32, a cartridge 100 is shown wherein analogous reference numbers refer to parts similar or the same as those described above and identified for the embodiment of FIGS. 1-8 and represent the same components unless noted otherwise herein. As best shown in FIGS. 9, 10, 15, 30 and 32, an upper surface 180 at an outlet end 124 of a body 112 can be formed so as to have a different stop mechanism in the form of arcuate stop feature(s) 184 thereon each of which has a side surface 186. A rotatable stop disk 188 is also provided for setting the cartridge so that it can operate clockwise or counterclockwise for placement as either a hot water cartridge or a cold water cartridge depending on how the handle and cartridge are configured together. The design of the stop feature further limits rotational movement once the rotatable stop disk is positioned. The rotatable stop disk engages at least one of side surface 186 of each of the arcuate stop features 184 and the rotatable stop disk 188 can be situated so as to enable orientation of the cartridge body for operational rotation (on and off movement of the faucet handle) in either a clockwise or counterclockwise direction In use, if the user wants to set an orientation for the handle and cartridge opposite of that provided by the manufacturer, the rotatable stop disk 188 can be lifted off the top of the cartridge spindle, rotated 90 degrees and placed back on top of the spindle. As shown in FIG. 9, the disk is in a position such that the orientation for the faucet handle would be to turn the cartridge clockwise. As shown in FIG. 15, small insignia, letters, colors, etc. can be provided by the manufacturer to identify the rotation orientation when of the rotatable stop disk 188. The user can then decide how, if at all, it wishes to change the orientation of the cartridge/faucet handle for use for hot water or cold water (i.e., counterclockwise or clockwise motion). Preferably two or more arcuate stops 184 and a disk 188 are provided.

A faucet assembly 200 is also included herein as shown in FIG. 17. The faucet assembly has at least one valve cartridge as described herein above, such as cartridge 10 or 100. As such cartridge is described in detail above, it is not further described herein. The assembly should have a faucet which has at least one faucet handle 202. As shown, there are two such handles 202, one for hot and one for cold, but single handle faucets may include similar cartridges. A fluid conduit 204, having a flexible hose, that screws onto a threaded shank 205 is shown as well. The conduit is attachable to the cartridge and to the faucet structure to allow water flowing therethrough to enter the cartridge through he lower inlet portion. The handle 202 is connected over faucet base 206 and the handles 202 actuate flow of fluid through the cartridge and conduit which flow then enters a faucet body 207 having an outlet 208 for fluid at an outlet end 210 and an inlet end 212 for receiving water from the conduit 204. When installed, quick connect nuts 214 or other shank nuts are provided thereon to lock the faucet against its mounting surface. The cartridge 10 shown (or cartridge 100 if used) may include stops as noted above.

Figure 30:
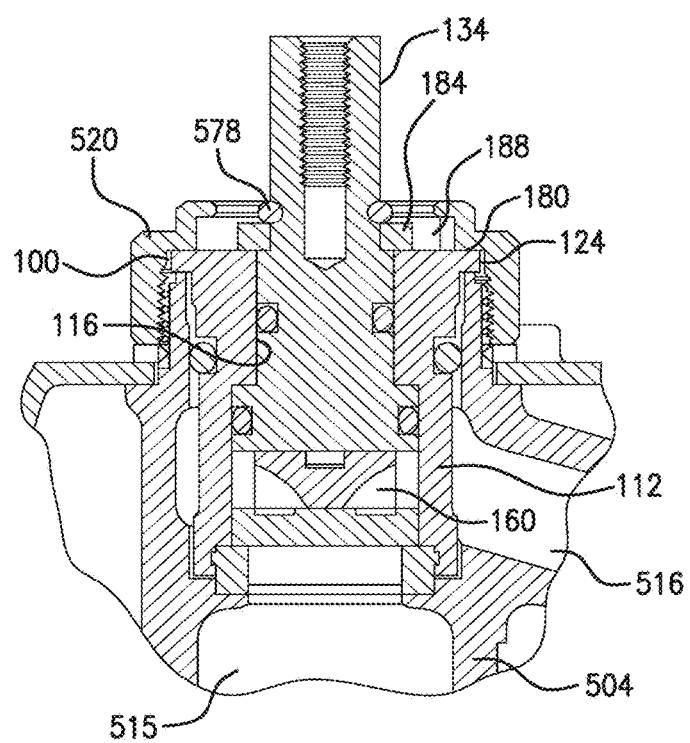
FIG. 30 is an enlarged portion of the cross-sectional view portion of FIG. 29.
Figure 31:
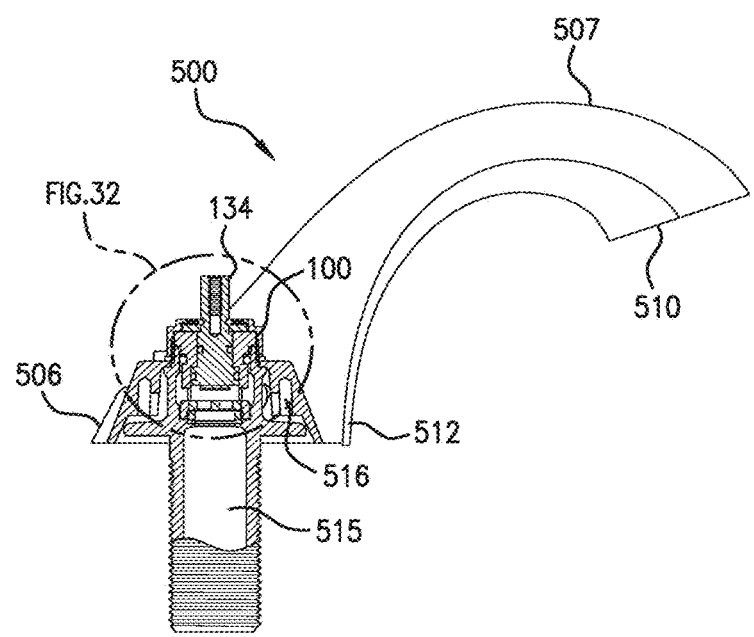
FIG. 31 is a partial cross-sectional, side elevational view of a faucet assembly including the valve cartridge of FIG. 9.
Figure 32:
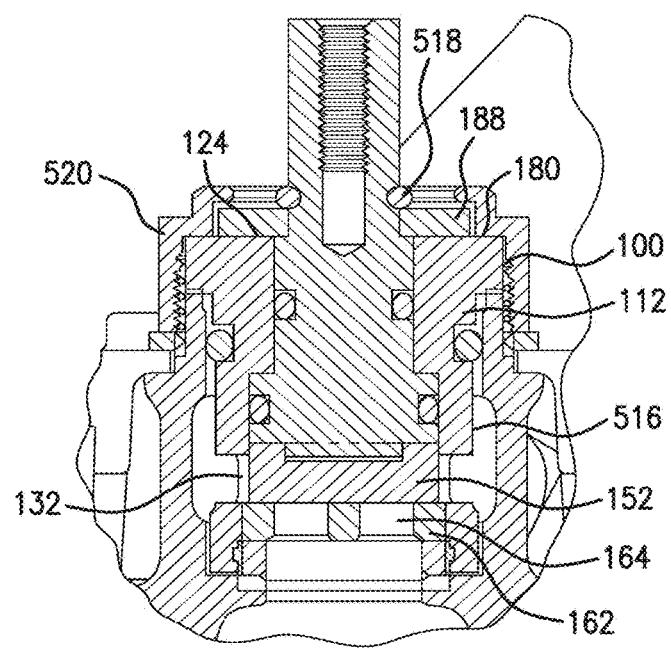
FIG. 32 is an enlarged portion of the cross-sectional view portion of FIG. 31.

As shown in the assembly of FIGS. 28-32, a cartridge such as cartridge 100 as in FIGS. 9-16 can be positioned as shown in a faucet assembly 500, wherein the orientation can be set as shown for counterclockwise (hot water) flow as in FIG. 30. When the cartridge turns counterclockwise, flow coming up through a passage 515 in a conduit 504 (which in this example may be a hot water conduit) enters the passage 118 through the cartridge body 112 through openings 164 in stationary disk 162. When the handle 502 (see FIG. 28) has the conduit in the off position, the movable disk 152 blocks passage of fluid through openings 132 in the cartridge body. Upon turning the handle counterclockwise, receiving areas 160 in movable disk 152 would align with openings 132 in the cartridge body 112 so that fluid from conduit passage 515 can flow through the water way through the cartridge body 112 described above and into conduit 516 leading to the inlet end 512 of the faucet body 507. The assembly may also optionally include a bonnet nut 520 or similar locking piece that can ensure that the rotatable stop disk 188 is properly situated against stop 184 in a desired configuration and would not be disturbed by movement of a handle 502. An additional optional seal 518, such as an o-ring, may also be positioned so as to fit around the spindle 134 for sealing the bonnet nut 520 against the spindle 134 of the cartridge 100.

Figure 19:
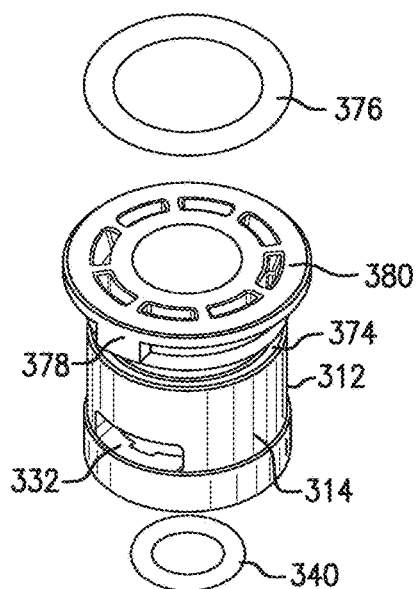
FIG. 19 is an exploded view of the valve cartridge of FIG. 18.
Figure 18:
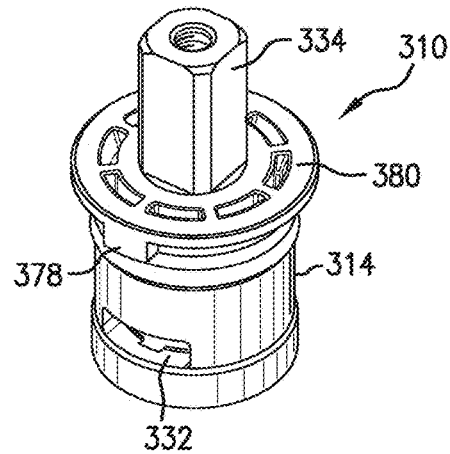
FIG. 18 is a perspective view of a further embodiment of a valve cartridge according to the invention without stop features.
Figure 24:
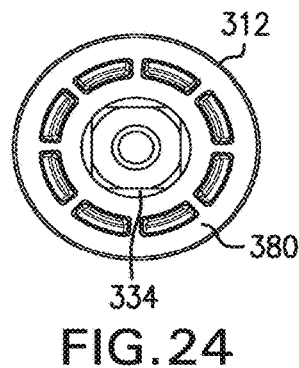
FIG. 24 is a top elevational view of the valve cartridge of FIG. 18.
Figure 25:
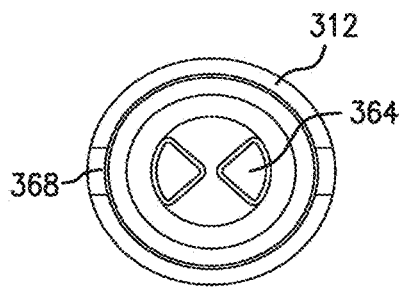
FIG. 25 is a bottom elevational view of the valve cartridge of FIG. 18.
Figure 20:
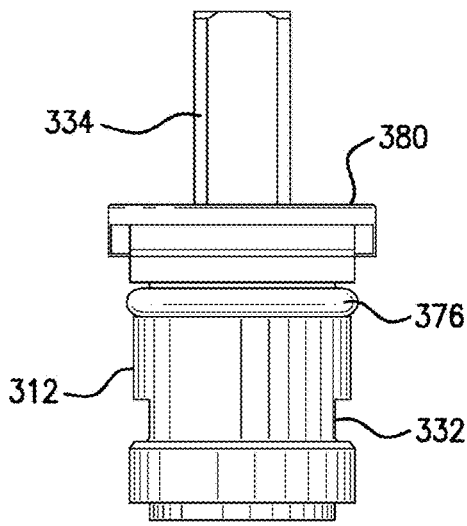
FIG. 20 is a side elevational view of the valve cartridge of FIG. 18.
Figure 21:
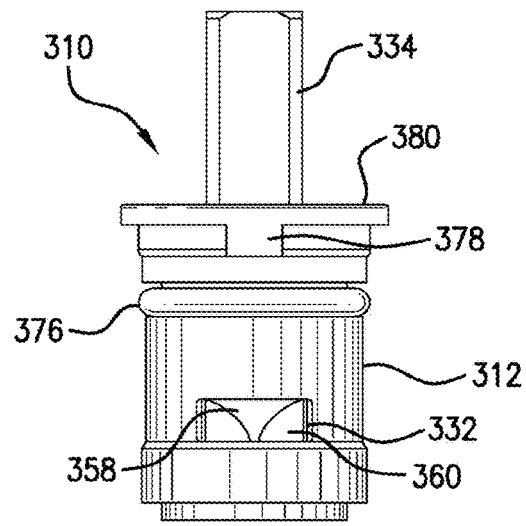
FIG. 21 is a further side elevational view of the valve cartridge of FIG. 18 showing a side opening therein.
Figure 22:
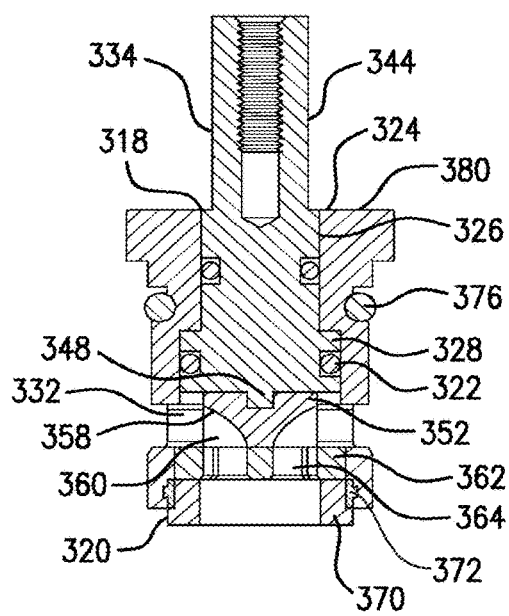
FIG. 22 is a longitudinal cross-sectional view of the valve cartridge of FIG. 20 taken along the longitudinal axis of FIG. 20.
Figure 23:
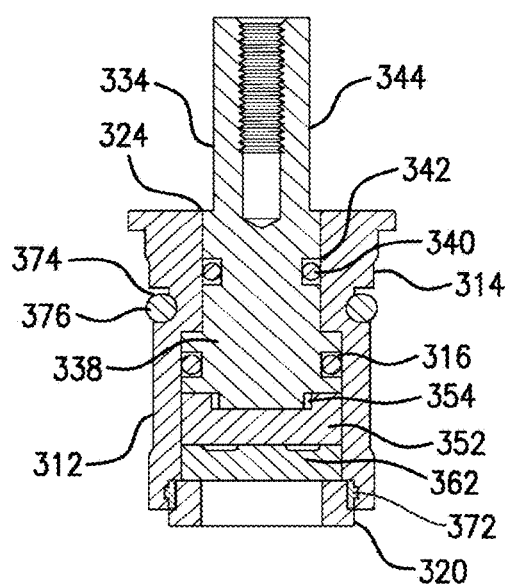
FIG. 23 is a longitudinal cross-sectional view of the valve cartridge of FIG. 21 taken along the longitudinal axis of FIG. 21.

FIGS. 18-25 represent yet a further embodiment of the invention 310 wherein no stop features are used in the design. As shown, all elements having analogous numbers are the same as the parts described above for embodiments of the cartridges 10 and 100. As shown in FIGS. 18, 19 and 24, the upper surface 380 has no stops but has a series of optional open slots. The cartridge functions without stops in that the cartridge can be used in a faucet assembly having features that provide alternative stopping mechanisms. As shown in FIGS. 18-25, the profile of the upper surface 380 in cartridge 310 lies flat and enables an even smaller size, as noted above. Smaller longitudinal measurements may be managed when omitting stop features on the cartridge body upper surface 380.

Figure 26:
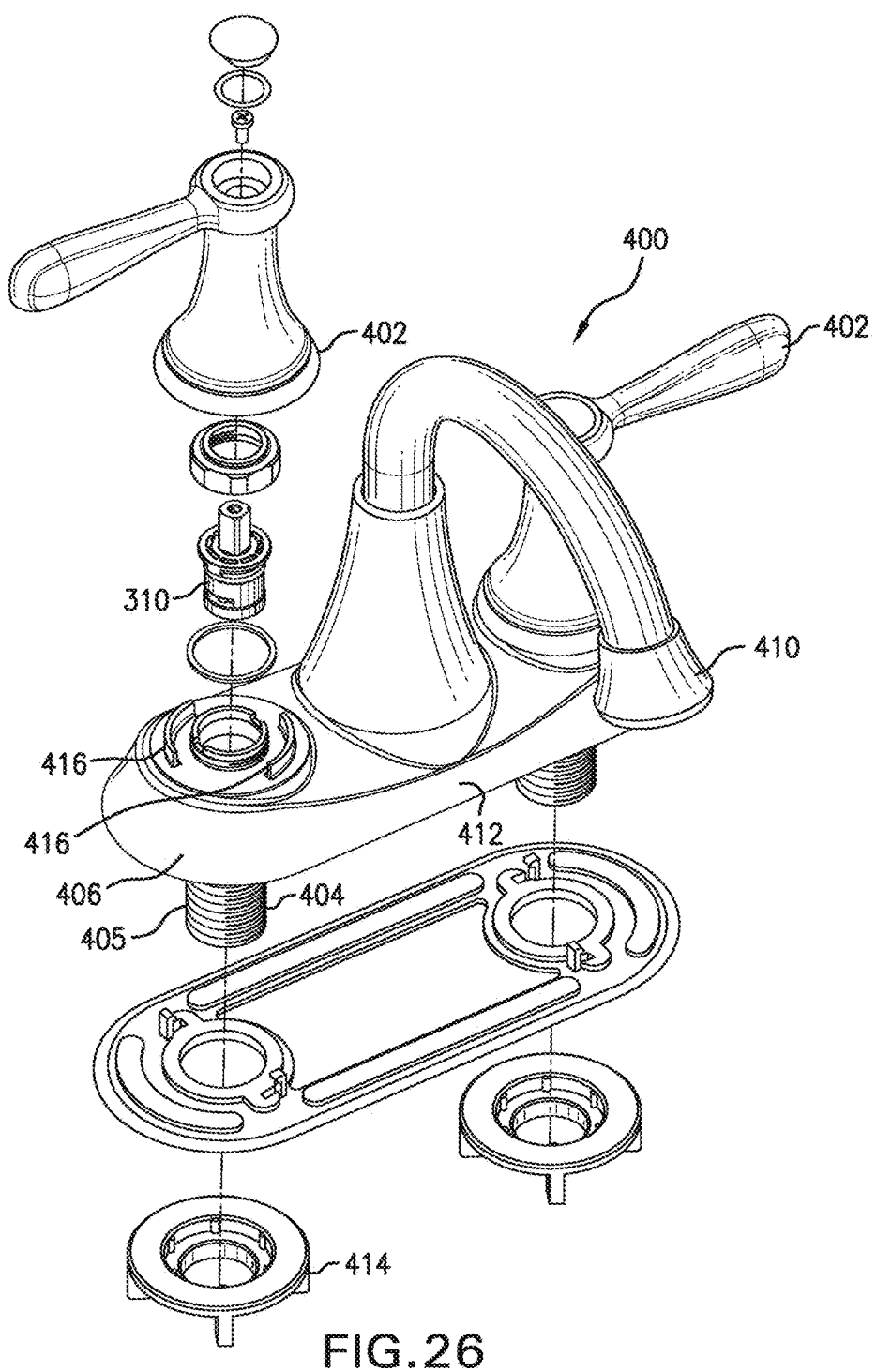
FIG. 26 is a perspective exploded view of the embodiment of a faucet assembly including the valve cartridge of FIG. 18.
Figure 27:
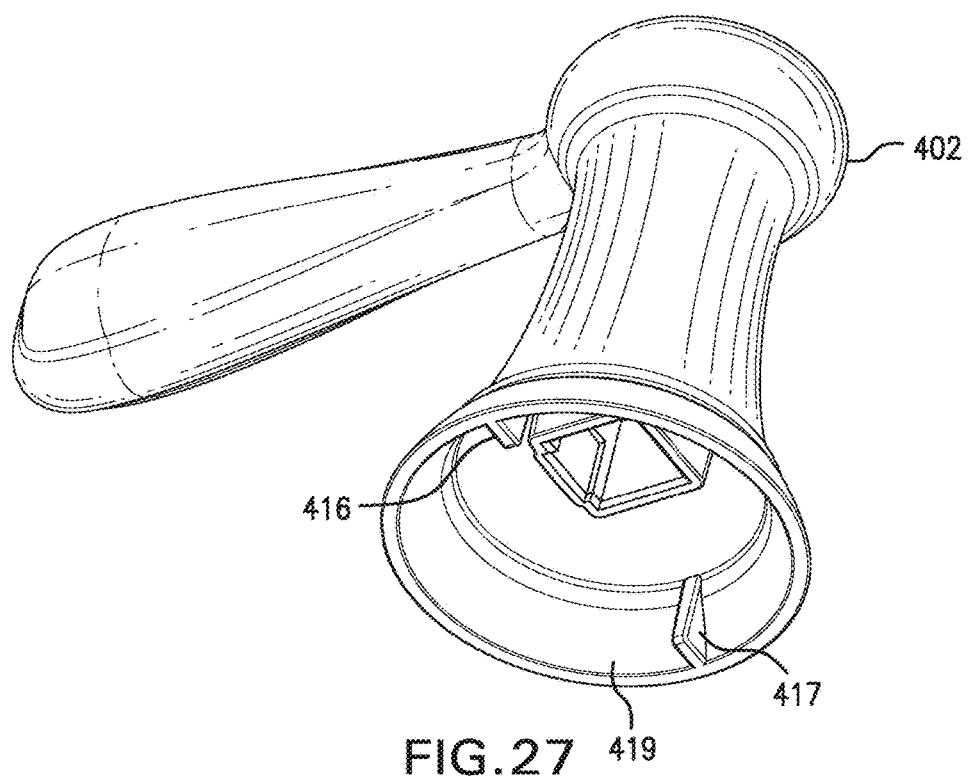
FIG. 27 is a rear perspective view of a faucet handle for use in the faucet assembly of FIG. 26.
Figure 28:
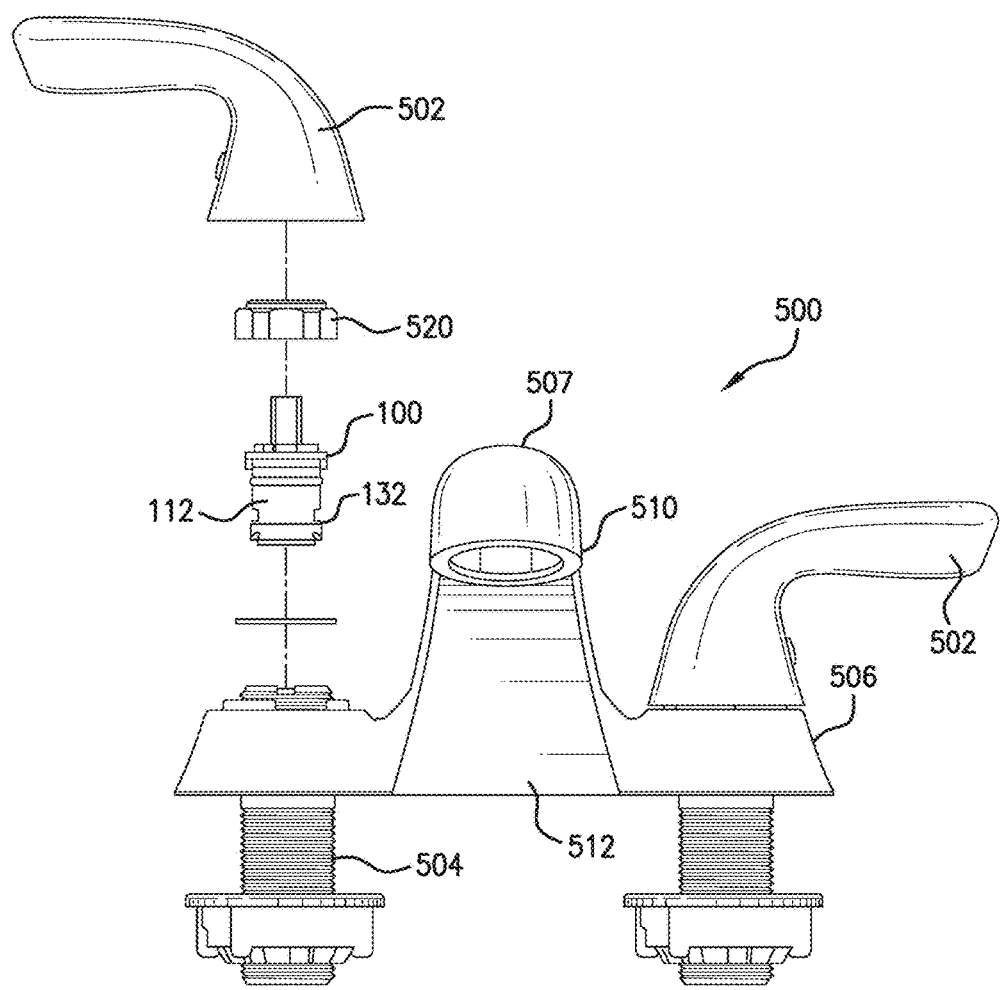
FIG. 28 is a partially exploded front elevational view of a faucet assembly having a valve cartridge in accordance with FIG. 9.
Figure 29:
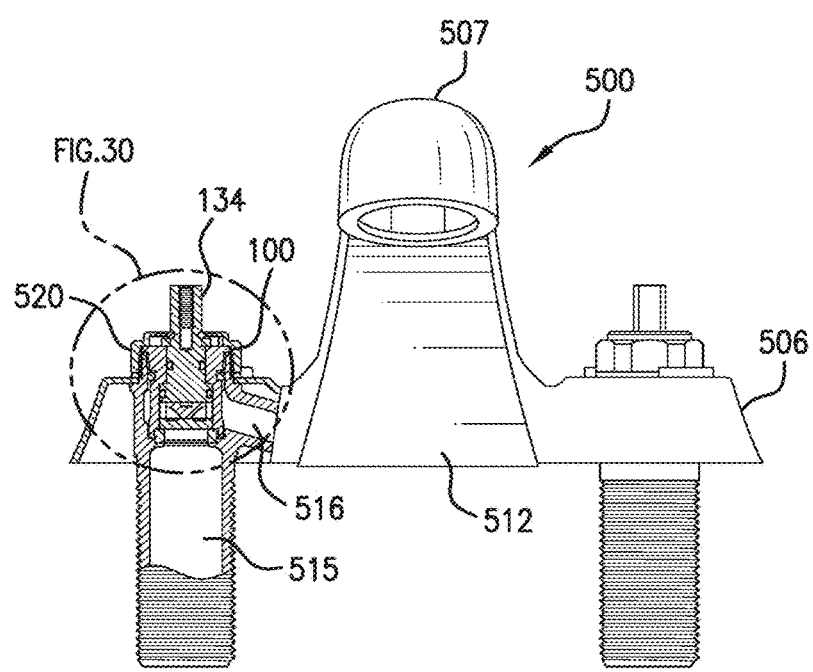
FIG. 29 is a partial cross-sectional, front elevational view of a faucet assembly including the valve cartridge of FIG. 9.

FIGS. 26 and 27 represent a faucet assembly 400 wherein a cartridge such as the no-stop cartridge 310 is preferably provided. In faucet assembly 400, a cartridge without stop features is installed on a faucet base 406. The base 406 in the area that receives a handle 402 is provided with one or more upwardly extending ribs 416. Such ribs may have various configurations, and as shown have a preferred construction in which the ribs 416 are generally arcuate in transverse cross section. Preferably there are two such opposing ribs 416 on opposite sides of the cartridge which are more preferably about 180° opposed. The curved aspect works best with a rotational movement under a curved handle configuration. Handles 402 as shown in FIG. 27 are specially configured to work with this design by having opposing ribs 417 on a lower surface 419 of the handle 402. The opposing ribs 417 are positioned so as to encounter and block or mate against the opposing ribs 416 on the upper surface on the faucet base 406. The ribs 417 preferably are "wedge"-shaped in longitudinal cross section, but the shape may vary as desired provided they function with opposing ribs 416 to perform a stop function. With such stop function, the handle can move from no fluid flow (closed flow wherein the faucet is turned off) to a full fluid flow for maximal flow rate, and controllably therebetween.

Other mini-cartridge designs and/or economically made cartridge designs can be formed in view of this disclosure and all are considered within the scope thereof. Preferably such embodiments demonstrate that the cartridge has the same low-cost, lower parts approach, with good flow characteristics and reduced size to allow for variations in faucet size and shape for pursuing various alternative aesthetic or utilitarian faucet designs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A valve cartridge for a faucet, comprising
a body having an exterior surface, an interior surface defining a longitudinally extending passage therethrough extending from an inlet opening to an outlet opening, and at least one side opening extending transversely through the body from the interior surface to the exterior surface;
a spindle formed of a one-piece construction having a lower end portion configured to fit in rotatable relationship with the interior surface of the body when situated within the passage of the body, an upper end portion that extends outwardly beyond the outlet opening of the body when the spindle is situated in the passage of the body, the lower end portion having a bottom surface, wherein the upper end portion is configured to be fitted within a faucet handle, wherein the bottom surface of the lower end portion of the spindle has a circular shape and is configured such that a circular edge of the lower end portion of the spindle contacts the valve cartridge body interior surface in a single plane in rotatable facing relationship;
a movable disk having an upper surface configured to contact a bottom surface of the lower end portion of the spindle, an arcuate side wall portion configured to fit within the passage of the body in rotatable facing relationship with the interior surface of the body and an inwardly extending side wall portion defining at least one fluid receiving area, wherein the receiving area is configured so that it can be rotated to align with the side opening in the body for allowing fluid flow out of the side opening of the body, wherein the upper surface of the movable disk comprises a single central slot configured to receive a tab extending from the bottom surface of the lower end portion of the spindle when the upper surface and bottom surface are in contact with one another;
a stationary disk having at least one opening therethrough for allowing passage of fluid from an inlet opening of the body through the side opening of the body when the opening in the stationary disk is aligned with the fluid receiving area in the movable disk, the stationary disk having a side wall capable of interacting with the interior surface of the body; and
a sealing ring for stabilizing and retaining the stationary disk, the spindle and the movable disk within the passage of the body, the sealing ring having a radially-outward-facing surface and having an extending portion between an uppermost edge and a lowermost edge of the sealing ring, the extending portion extending radially beyond the radially-outward-facing surface and capable of mating with the interior surface of the body, wherein the interior surface of the body at a location on or near the inlet end of the body has a groove for receiving the extending portion of the sealing ring.

2. The valve cartridge of claim 1, wherein body is no greater than about 25 mm measured longitudinally, no greater than about 20 mm measured transversely at the outlet end of the body, wherein the body is not greater than about 19 mm measured transversely at the inlet end of the body.

3. The valve cartridge of claim 2, wherein the body is no greater than about 20 mm measured longitudinally, no greater than about 19 mm measured transversely at the outlet end of the body, and not greater than about 15.5 mm measured transversely at the inlet end of the body.

4. The valve cartridge of claim 1, wherein the exterior surface comprises at least one sealing groove for receiving a seal therein.

5. The valve cartridge of claim 1, wherein the exterior surface of the body comprises at least one feature on an upper portion thereof on or near the outlet end of the body for use in seating the valve cartridge within or on a fluid conduit.

6. The valve cartridge of claim 5, wherein the feature is a locking tab and the body comprises two opposed locking tabs.

7. The valve cartridge of claim 1, having an upper surface at the outlet end thereof having at least one raised stop feature thereon for limiting rotational movement of the valve cartridge when in use.

8. The valve cartridge of claim 7, wherein there are two opposing raised wedge-shaped stop features.

9. The valve cartridge of claim 7, wherein the at least one raised stop feature comprises a side surface flush with the valve cartridge body interior surface defining the longitudinally extending passage.

10. The valve cartridge of claim 1, wherein there are two opposing arcuate stop features each having a side surface, and the cartridge further comprises a rotatable stop disk for engaging the side surfaces of the arcuate stop features and the rotatable stop disk can be situated so as to enable orientation of the cartridge body for operational rotation in either a clockwise or counterclockwise direction.

11. The valve cartridge of claim 1, wherein the lower end portion of the spindle has a groove on the exterior thereof for receiving a seal capable of providing sealing engagement between the interior surface of the body and the lower end portion of the spindle.

12. The valve cartridge of claim 1, wherein at least one of the movable disk, the stationary disk and/or the housing comprises a ceramic material.

13. The valve cartridge of claim 1, wherein the sealing ring comprises at least one of polytetrafluoroethylene, silicone, silicone rubber, ethylene-propylene rubber, ethylene-propylene diamine rubber, ethylene-propylene polymethylene rubber, nitrile rubbers, fluoroplastics and/or fluoroelastomers.

14. The valve cartridge of claim 1, wherein the spindle upper end portion and lower end portion each comprise stainless steel.

15. The valve cartridge of claim 1, wherein the upper end portion of the spindle has a threaded recess therein for receiving a screw or threaded insert for securely attaching the cartridge to a faucet handle.

16. The valve cartridge of claim 1, wherein the body has two side openings and the stationary disk has two openings therethrough for allowing passage of fluid from the inlet opening of the body through the side openings of the body when the openings in the stationary disk are aligned with the fluid receiving areas in the movable disk.

17. The valve cartridge of claim 16, wherein there are two fluid receiving areas in the movable disk.

18. The valve cartridge of claim 1, wherein the stationary disk has at least one locking extension that is capable of mating with a mating groove on an interior surface of the body.

19. The valve cartridge of claim 1, wherein the sealing ring is flexible.

20. The valve cartridge of claim 1, wherein the body is formed from a one-piece construction.

21. The valve cartridge of claim 1, wherein the valve cartridge is configured to be installed by inserting the valve cartridge into a top of a fluid conduit.

22. The valve cartridge of claim 21, wherein the body is formed from a one-piece construction.

23. A valve cartridge for a faucet, comprising
a body having an exterior surface, an interior surface defining a longitudinally extending passage therethrough extending from an inlet opening to an outlet opening, and at least one side opening extending transversely through the body from the interior surface to the exterior surface;
a spindle formed of a one-piece construction having a lower end portion configured to fit in rotatable relationship with the interior surface of the body when situated within the passage of the body, an upper end portion that extends outwardly beyond the outlet opening of the body when the spindle is situated in the passage of the body, the lower end portion having a bottom surface, wherein the upper end portion is configured to be fitted within a faucet handle, wherein the bottom surface of the lower end portion of the spindle has a circular shape and is configured such that a circular edge of the lower end portion of the spindle contacts the valve cartridge body interior surface in a single plane in rotatable facing relationship;
a movable disk having an upper surface configured to contact a bottom surface of the lower end portion of the spindle, an arcuate side wall portion configured to fit within the passage of the body in rotatable facing relationship with the interior surface of the body and an inwardly extending side wall portion defining at least one fluid receiving area, wherein the receiving area is configured so that it can be rotated to align with the side opening in the body for allowing fluid flow out of the side opening of the body, wherein the upper surface of the movable disk comprises a single central slot configured to receive a tab extending from the bottom surface of the lower end portion of the spindle when the upper surface and bottom surface are in contact with one another;
a stationary disk having at least one opening therethrough for allowing passage of fluid from an inlet opening of the body through the side opening of the body when the opening in the stationary disk is aligned with the fluid receiving area in the movable disk, the stationary disk having a side wall capable of interacting with the interior surface of the body; and
a sealing ring for stabilizing and retaining the stationary disk, the spindle and the movable disk within the passage of the body, the sealing ring having a radially-outward-facing surface and having an extending portion between an uppermost edge and a lowermost edge of the sealing ring, the extending portion extending radially beyond the radially-outward-facing surface and capable of mating with the interior surface of the body, wherein the interior surface of the body at a location on or near the inlet end of the body has a groove for receiving the extending portion of the sealing ring, wherein the valve cartridge is configured to be installed by inserting the valve cartridge into a top of a fluid conduit.

24. The valve cartridge of claim 23, wherein the body is formed of a one-piece construction.

25. The valve cartridge of claim 23, wherein the body is not greater than about 19 mm measured transversely at the inlet end of the body.

26. A valve cartridge for a faucet, comprising
a body formed of a one-piece construction having an exterior surface, an interior surface defining a longitudinally extending passage therethrough extending from an inlet opening to an outlet opening, and at least one side opening extending transversely through the body from the interior surface to the exterior surface;
a spindle formed of a one-piece construction having a lower end portion configured to fit in rotatable relationship with the interior surface of the body when situated within the passage of the body, an upper end portion that extends outwardly beyond the outlet opening of the body when the spindle is situated in the passage of the body, the lower end portion having a bottom surface, wherein the upper end portion is configured to be fitted within a faucet handle, wherein the bottom surface of the lower end portion of the spindle has a circular shape and is configured such that a circular edge of the lower end portion of the spindle contacts the valve cartridge body interior surface in a single plane in rotatable facing relationship;
a movable disk having an upper surface configured to contact a bottom surface of the lower end portion of the spindle, an arcuate side wall portion configured to fit within the passage of the body in rotatable facing relationship with the interior surface of the body and an inwardly extending side wall portion defining at least one fluid receiving area, wherein the receiving area is configured so that it can be rotated to align with the side opening in the body for allowing fluid flow out of the side opening of the body, wherein the upper surface of the movable disk comprises a single central slot configured to receive a tab extending from the bottom surface of the lower end portion of the spindle when the upper surface and bottom surface are in contact with one another;
a stationary disk having at least one opening therethrough for allowing passage of fluid from an inlet opening of the body through the side opening of the body when the opening in the stationary disk is aligned with the fluid receiving area in the movable disk, the stationary disk having a side wall capable of interacting with the interior surface of the body; and
a sealing ring for stabilizing and retaining the stationary disk and movable disk within the passage of the body, the sealing ring having a radially-outward-facing surface and having an extending portion between an uppermost edge and a lowermost edge of the sealing ring, the extending portion extending radially beyond the radially-outward-facing surface and capable of mating with the interior surface of the body, wherein the interior surface of the body at a location on or near the inlet end of the body has a groove for receiving the extending portion of the sealing ring.

27. The valve cartridge of claim 26, wherein the valve cartridge is configured to be installed by inserting the valve cartridge into a top of a fluid conduit.

28. The valve cartridge of claim 26, wherein the body is not greater than about 19 mm measured transversely at the inlet end of the body.

* * * * *